United States Patent

Katsuta

[11] Patent Number: 6,014,683
[45] Date of Patent: Jan. 11, 2000

[54] ARITHMETIC OPERATION SYSTEM FOR ARITHMETICALLY OPERATING A FIRST OPERAND HAVING AN ACTUAL POINT AND A SECOND OPERAND HAVING NO ACTUAL POINT

[75] Inventor: Hiroshi Katsuta, Tokyo, Japan

[73] Assignee: NEC Corporation, Tokyo, Japan

[21] Appl. No.: 08/995,861

[22] Filed: Dec. 22, 1997

[30] Foreign Application Priority Data

Dec. 20, 1996 [JP] Japan ..................... 8-340695

[51] Int. Cl.[7] ...................................... G06F 7/38
[52] U.S. Cl. ............................................ 708/490
[58] Field of Search ..................... 364/736.01, 745.02, 364/748.01, 748.03

[56] References Cited

U.S. PATENT DOCUMENTS 5,530,662  6/1996  Ide ..................................... 364/736.01

FOREIGN PATENT DOCUMENTS

| 60-164247 | 10/1985 | Japan . |
| 1-116730 | 5/1989 | Japan . |
| 2-183828 | 7/1990 | Japan . |
| 4-73249 | 6/1992 | Japan . |
| 5-143324 | 6/1993 | Japan . |
| 5-224888 | 9/1993 | Japan . |
| 6-180649 | 6/1994 | Japan . |

Primary Examiner—Tan V. Mai
Attorney, Agent, or Firm—Foley & Lardner

[57] ABSTRACT

An arithmetic operation system is provided, which is capable of floating-point arithmetic operation at high speed using minimal hardware devices. The position of an actual point of a first operand is detected by an actual point detector, resulting in a position data and a bit number data according to the detected position. A third operand having no actual point is generated by shifting the first operand having the actual point by the first shifter according to the bit number data. The second and third operands, both of which have no actual point, are arithmetically operated by an integer arithmetic operator to output a first operation result. The first operation result is rounded by a rounder according to the position data to output a second operation result. The second operation result having the actual position is generated by shifting the second operation result thus rounded to right by a second shifter according to the bit number data. Thus, the floating-point arithmetic operation for the first and second operands is able to be performed without any dedicated-purpose floating-point arithmetic processor nor operator.

15 Claims, 9 Drawing Sheets

ARITHMETIC OPERATION SYSTEM FOR ARITHMETICALLY OPERATING A FIRST OPERAND HAVING AN ACTUAL POINT AND A SECOND OPERAND HAVING NO ACTUAL POINT

BACKGROUND OF THE INVENTION

1. Field of the Invention

The present invention relates to an arithmetic operation system and more particularly, to an arithmetic operation system that operates arithmetically a first operand having a point and a second operand having no point without using any dedicated floating-point arithmetic operating subsystem such as a floating-point arithmetic operating processor and a floating-point arithmetic operating digital signal processor (DSP).

2. Description of the Prior Art

When an arithmetic operation giving an output y by multiplying a variable x having no point by a gain k having a point (i.e., y=k·x) is performed in electronic control applications, floating-point arithmetic operation is essentially needed.

In conventional microcomputer application systems of this sort, a dedicated floating-point arithmetic operating DSP is additionally provided together with a microcomputer to provide a floating-point arithmetic operation. Alternately, a high-performance microcomputer incorporating a floating-point arithmetic operating function is used. This is because a typical microcomputer or DSP is capable of integer arithmetic operation (i.e., fixed-point arithmetic operation) only.

However, the conventional microcomputer application systems equipped with the dedicated floating-point arithmetic operating DSP has a problem that the dedicated DSP raises the fabrication cost of the microcomputer application systems. The conventional microcomputer application systems equipped with the high-performance microcomputer incorporating the floating-point arithmetic function has a problem that a dedicated floating-point arithmetic operation unit needs to be provided for realizing the floating-point arithmetic function, resulting in a raised fabrication cost of the microcomputer application systems.

A floating-point multiplier applicable to the above dedicated floating-point arithmetic operation unit is disclosed in the Japanese Non-Examined Patent Publication No. 2-183828 published in 1990.

However, the conventional floating-point multiplier disclosed in the Japanese Non-Examined Patent Publication No. 2-183828 has a problem that this multiplier has a complex configuration. This is because, unlike a fixed-point multiplier, this multiplier requires various dedicated circuits such as a rounding circuit for rounding the significands of numbers to be multiplied, shifters for arithmetically shifting the significands and exponents, adders for the exponents, carry detectors, and multiplexers.

To solve the above problems, and improvement was reported in an article entitled "whole power electronics" of the book entitled "OHM", Vol. 9, p.95, 1993, published by Ohm publishing Co. Ltd.. In this improvement, a floating-point arithmetic operation is performed with the use of a typical microcomputer capable of an integer (i.e., fixed-point) arithmetic operation and a dedicated software produced therefor. This software has the following steps as shown in FIG. 1.

Here, as shown in FIG. 2, it is supposed that the gain K is m bits wide and has a fraction of n bits in width, where n<m. Therefore, the most significant bit (MSB) of the gain K is bit (m−1) and the least significant bit (LSB) thereof is bit 0. An actual binary point P is located between bit n and bit (n−1).

In the step S1 shown in FIG. 1, the gain K is shifted left by n bits (i.e., the gain K is multiplied by $2_{ten}{}^n$) to convert it to an integer coefficient k. The coefficient k has an assumed binary point P' located between bit (n−1) and bit n, as shown in FIG. 2.

In the step S2, the integer coefficient k is multiplied by the fraction variable x, producing a product Y (i.e., Y=k·x).

In the step S3, it is judged whether the fraction of the product Y is less than 0.1 in binary (i.e., $0.1_{two}$) or not. The number 0.1 in binary is equal to a number 0.5 in decimal (i.e., $0.5_{ten}$). This judgment is carried out to round off the product Y at bit (n−1), thereby minimizing the rounding error of the product y.

When the assumed fraction of the product Y, which is located during bit (n−1) and bit 0, is not less than $0.1_{two}$ or $0.5_{ten}$, a variable T is set as 1 in binary (i.e., $1_{two}$) in the step S4. This step S4 is performed for the purpose of rounding off the product Y to "$1_{two}$" as bit n.

Then, the variable T of $1_{two}$ is shifted left by n bits in the step S6. The left-shifted variable T is added to the product Y in the step S7.

Finally, the product Y is shifted right by n bits (i.e., the product Y is divided by $2_{ten}{}^n$), thereby producing the rounded product y of the gain K and the variable x in the step S8. The actual point P of the product y is located at the right side of bit 0 due to the above rounding off. In other words, the product y has an integer value.

On the other hand, when the assumed fraction of the product Y is less than $0.1_{two}$ or $0.5_{ten}$, the variable T is set as $0_{two}$ in the step S5.

Then, the variable T of $0_{two}$ is shifted left by n bits in the step S6. The left-shifted variable T is added to the product Y in the step S7. Because the variable T has a value of $0_{two}$, no change occurs in the value of the product Y.

Finally, the product X is shifted right by n bits, thereby producing the rounded product y of the gain K and the variable x in the step S8.

In the microcomputer application systems, the arithmetic operation accuracy is dependent upon the way how to operate arithmetically the fraction of a data value. Therefore, the arithmetic operation method for the fraction of a data value is very important in view of operation accuracy.

For example, in feedback control systems such as position control systems using electric motors, arithmetic operation of the integrated data values including fraction numbers is essentially required. In this case, the arithmetic operation method for the fraction of a data value largely affects the control accuracy of the feedback control systems.

With the conventional floating-point arithmetic operation with the use of a dedicated software shown in FIG. 1, a wanted operation accuracy may be realized. However, in this case, the floating-point arithmetic operation is performed by executing the software by a central processing unit (CPU) of a microcomputer in a microcomputer application system. As a result, there is a problem that it takes a long time to complete the arithmetic operation. This means that the above conventional floating-point arithmetic operation using the software is unable to be applied to microcomputer application systems necessitating high-speed control actions.

On the other hand, the occurrence rate of the processes necessitating the floating-point arithmetic operation is not high within the overall processes of the microcomputer application systems. Therefore, even if a dedicated floating-point arithmetic operating DSP or a dedicated floating-point arithmetic operation unit is additionally introduced, the high-cost dedicated DSP or unit thus introduced is not effectively utilized.

SUMMARY OF THE INVENTION

Accordingly, an object of the present invention is to provide an arithmetic operation system capable of floating-point arithmetic operation at high speed using minimal hardware devices.

Another object of the present invention is to provide a floating-point arithmetic operation system that implements floating-point arithmetic operation while minimizing the instruction processing steps of a CPU.

The above objects together with others not specifically mentioned will be come clear to those skilled in the art from the following description.

According to the present invention, an arithmetic operation system for arithmetically operating a first operand having an actual point and a second operand having no actual point is provided.

This system is comprised of (a) an actual point detector for detecting a position of the actual point of the first operand to output a first position data and a bit number data, (b) a first register for storing the first position data, (c) a second register for storing the bit number data, (d) a first shifter for shifting left the first operand by specific bits according to the bit number data stored in the second register to output a third operand having no actual point, (e) an integer arithmetic operator for arithmetically operating the second and third operands to output a first operation result, (f) an assumed point designator for designating a position of an assumed point of the first operation result according to the first position data, (g) a rounder for rounding the first operation result according to the designated assumed point of the first operation result by the assumed point designator to output a second operation result, and (h) a second shifter for shifting right the second operation result by the specific bits according to the bit number data to output a third operation result having no actual point.

The third operation result represents a rounded operation result of the first and second operands.

With the arithmetic operation system according to the present invention, the position of the actual point of the first operand is detected by the actual point detector, resulting in the first position data and the bit number data. The third operand having no actual point is generated by shifting left the first operand having the actual point by the first shifter according to the bit number data. The second and third operands, both of which have no actual point, are arithmetically operated by the integer arithmetic operator, thereby outputting the first operation result.

The first operation result thus outputted is then rounded by the rounder according to the designated assumed point of the first operation result, thereby outputting the second operation result.

Further, the third operation result having no actual point is generated by shifting right the second operation result thus rounded by the second shifter according to the bit number data.

Accordingly, a floating-point arithmetic operation for the first and second operands is able to be performed without any dedicated floating-point arithmetic operating DSP nor dedicated floating-point arithmetic operation unit. This leads to decrease in fabrication cost of this system.

Also, the above floating-point arithmetic operation is performed by using the actual point detector, the first and second registers, the first and second shifters, the integer arithmetic operator, the assumed point designator, and the rounder. In other words, this operation is performed without the use of any dedicated software for floating-point arithmetic operation, with the use of hardware devices.

As a result, this operation is able to be performed at high speed using minimal hardware devices while minimizing the instruction processing steps of a CPU.

In a preferred embodiment of the system according to the present invention, an output of the integer arithmetic operator is connected to an input of the rounder, so that the first operation result outputted from the integer arithmetic operator is directly inputted into the rounder.

In this case, there is an additional advantage that the bus configuration may be simple.

In another preferred embodiment of the system according to the present invention, a third register is additionally provided for storing the second operation result outputted from the integer arithmetic operator. The second operation result stored in the third register is applied to the rounder.

In this case, there is an additional advantage that various arithmetic operations may be performed as necessary by using the second operation result stored in the third register.

In still another preferred embodiment of the system according to the present invention, the assumed point designator outputs a second position data giving the position of the assumed point of the first operation result, and the second position data is stored in a fourth register.

In this case, there is an additional advantage that no competition between the rounding process of the first operation result by the rounder and the reading process of the first register will occur.

In a further preferred embodiment of the system according to the present invention, the actual point detector is formed by an arithmetic logic unit (ALU).

In this case, there is an additional advantage that the configuration of the actual point detector may be simple.

In a still further preferred embodiment of the system according to the present invention, the first and second shifters are formed by a single bidirectional shifter.

In this case, there is an additional advantage that the configuration of the first and second shifters may be simple.

BRIEF DESCRIPTION OF THE DRAWINGS

In order that the present invention may be readily carried into effect, it will now be described with reference to the accompanying drawings.

DETAILED DESCRIPTION OF THE PREFERRED EMBODIMENTS

Preferred embodiments of the present invention will be described below referring to the attached FIGS. 3 to 8.

FIRST EMBODIMENT

Figure 3:
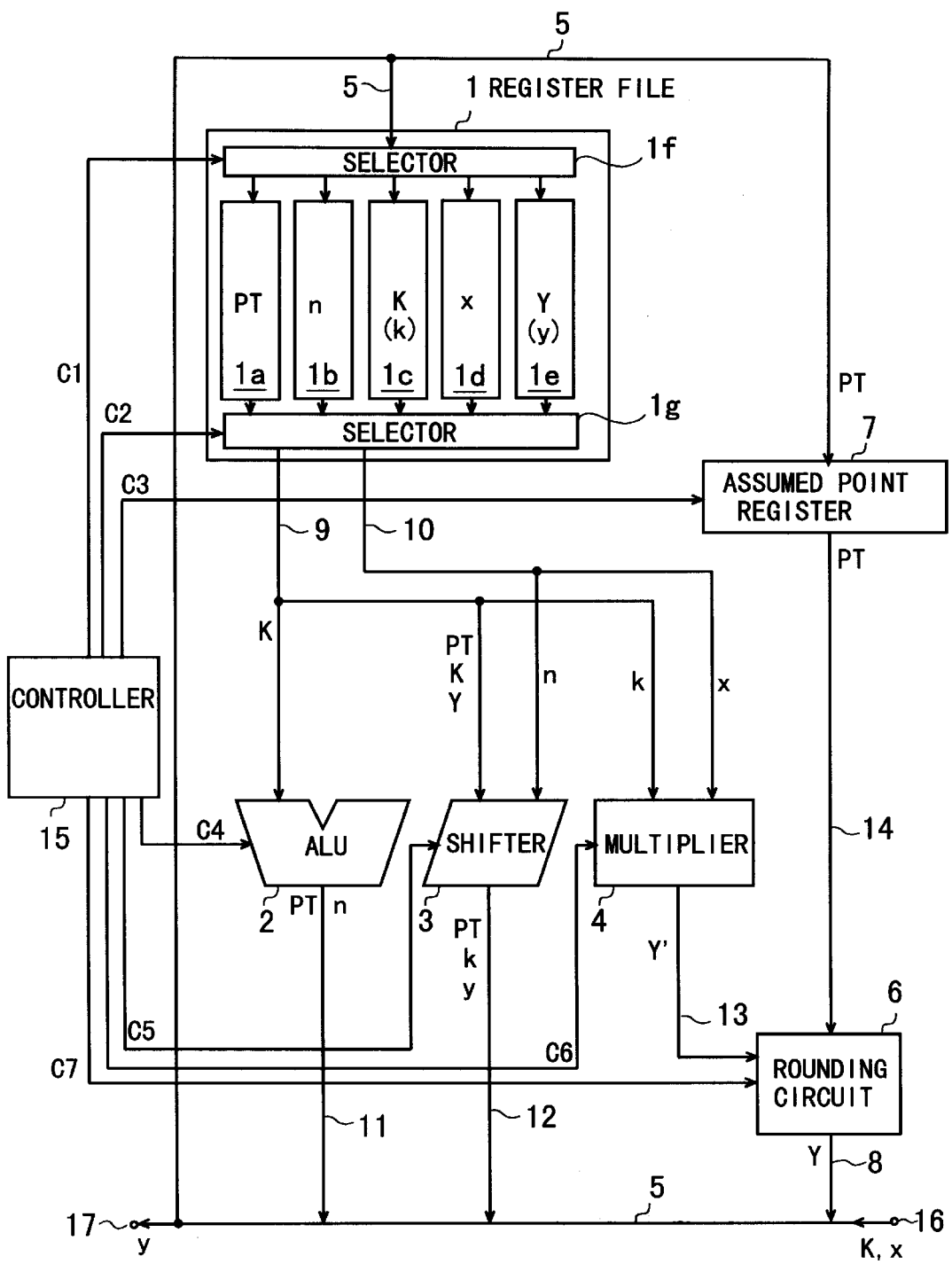
FIG. 3 is a block diagram showing the configuration of an arithmetic operation system according to a first embodiment of the present invention.

As shown in FIG. 3, an arithmetic operation system according to a first embodiment of the present invention is comprised of a register file 1, an ALU 2, a bidirectional shifter 3, a multiplier 4, a rounding circuit 6, an assumed point register 7, and a controller 15. The register file 1, the ALU 2, the shifter 3, the multiplier 4, the rounding circuit 6, and the assumed point register 7 are controlled by the controller 15.

A gain K and a variable x to be multiplied are inputted into an input terminal 16 located at one end of a common bus 5. A rounded product y of the gain K and the variable x (i.e., $y \approx K \cdot x$) is derived from an output terminal 17 located at another end of the common bus 5.

Figure 1:
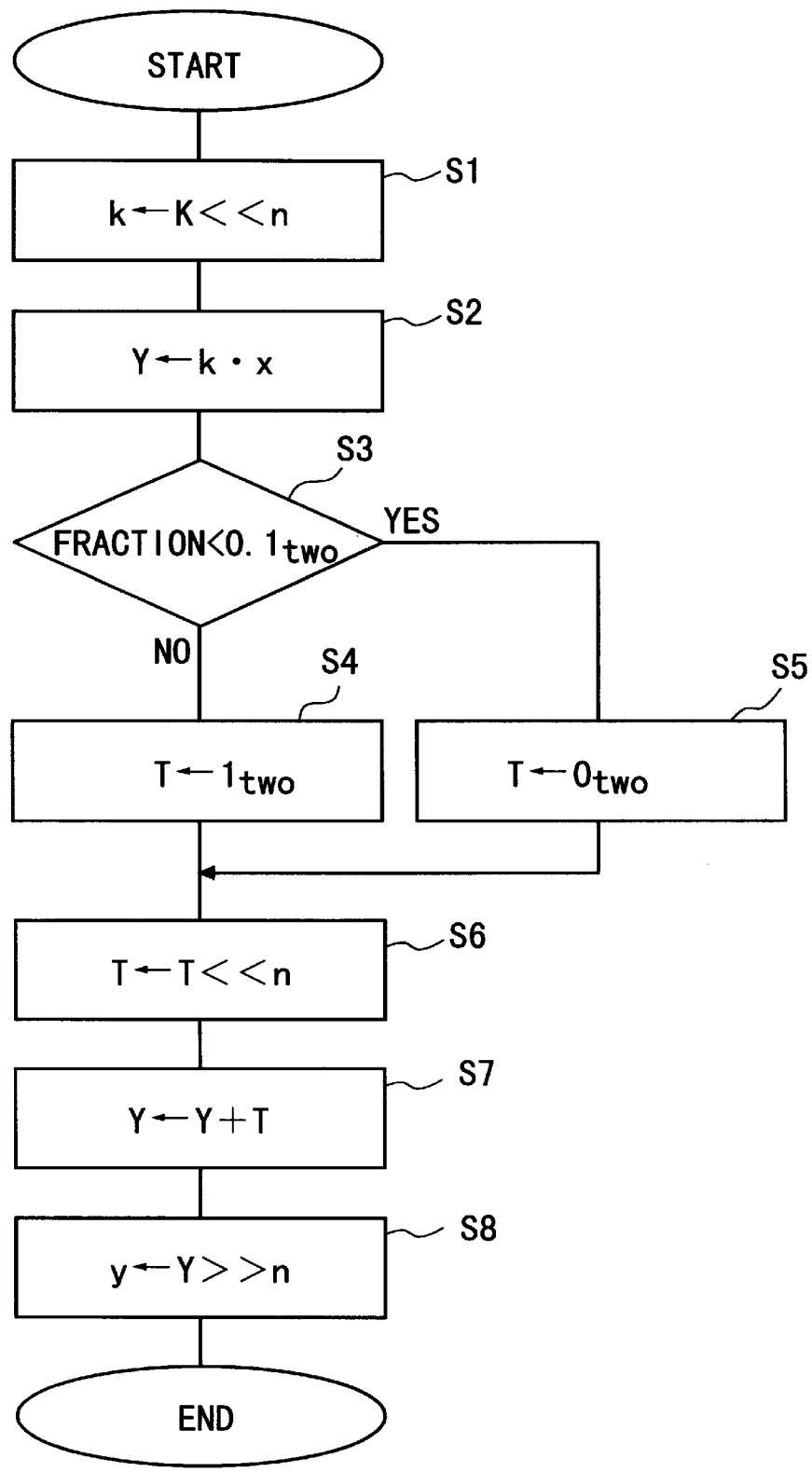
FIG. 1 is a flow chart showing the step sequence of a conventional floating-point arithmetic operation using a dedicated software and a fixed-point arithmetic operator.
Figure 2:
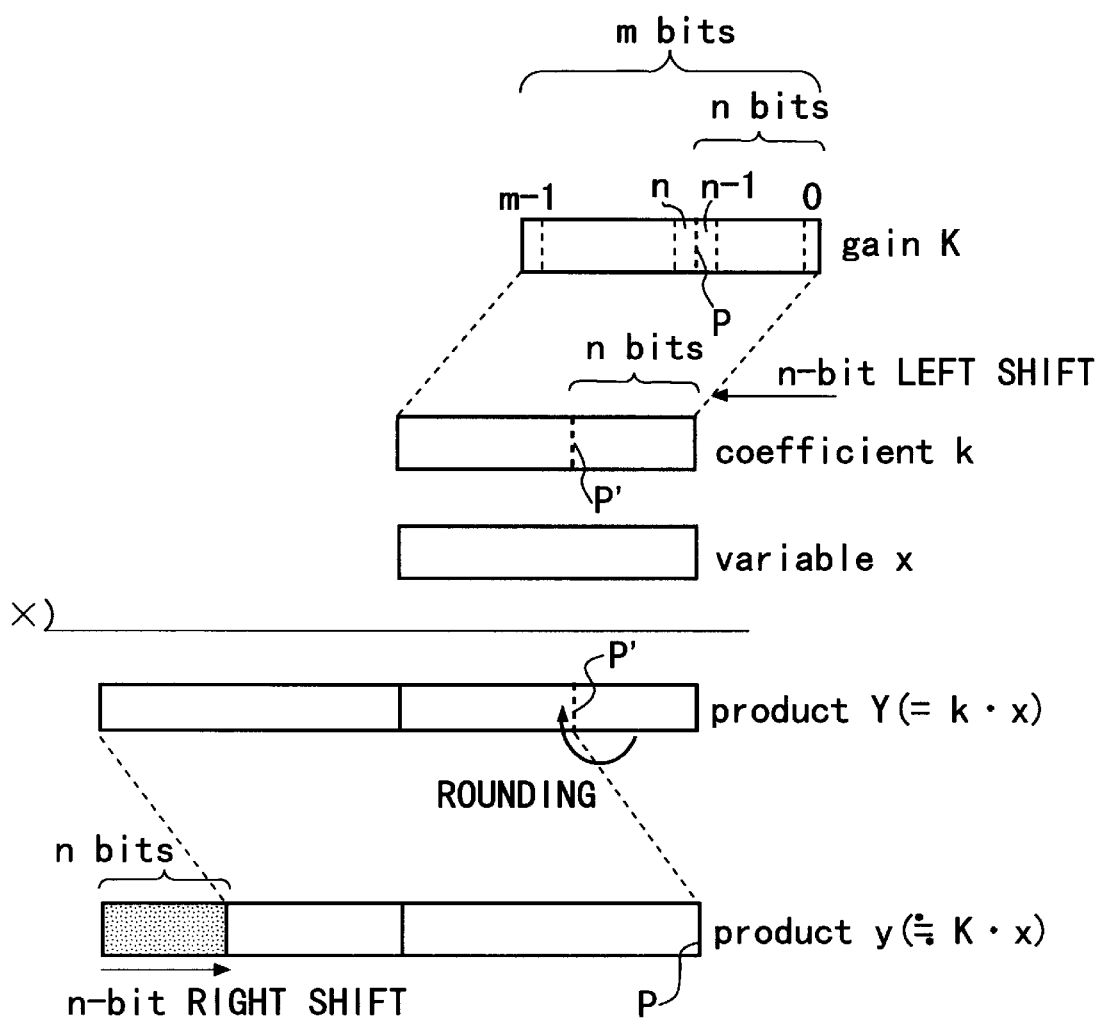
FIG. 2 is a diagram schematically showing the concept of a floating-point arithmetic operation giving the product y of the gain K having an actual point and the variable x having no actual point.

As shown in FIG. 2, the gain K is m bits wide and has an actual binary point P. The fraction of the gain K is n bits wide and the integer thereof is (m−n) bits wide, where m>n. The MSB and LSB of the gain K are bit (m−1) (i.e., the leftmost bit) and bit 0 (i.e., the rightmost bit), respectively. The actual binary point P is located between bit (n−1) and bit n.

The register file 1 includes five general-purpose registers 1a, 1b, 1c, 1d, and 1e, and two selectors or multiplexers 1f and 1g.

The input selector 1f selects one of the registers 1a, 1b, 1c, 1d, and 1e according to a control signal C1 sent from the controller 15, allowing an input data to be written or stored in the selected one of the registers 1a, 1b, 1c, 1d, and 1e through a bus 5. The output selector 1g selects one of the registers 1a, 1b, 1c, 1d, and 1e according to a control signal C2 sent from the controller 15, allowing the content (i.e., the stored data) of the selected one of the registers 1a, 1b, 1c, 1d, and 1e to be read or taken out to a bus 9 or 10. The bus 9 is connected to the ALU 2, the bidirectional shifter 3, and the multiplier 4. The bus 10 is connected to the bidirectional shifter 3 and the multiplier 4.

The register 1a stores the position data PT of the assumed binary point P' of the gain K. The register 1b stores the bit number data n of the gain K to be shifted in the shifter 3. The register 1c stores the gain K or the coefficient k. The coefficient k is given by shifting left the gain K by specific bits equal to the bit number data n, which has an integer value and no actual binary point. The register 1d stores the variable x having an integer value. The register 1e stores the product y or Y. The product Y is given by multiplying the variable x with the coefficient k and rounding the multiplication result Y'(=k·x).

The assumed point register 7 stores the position data PT of the assumed binary point P' of the gain K, which is sent from the shifter 3 through the bus 5. The register 7 outputs the position data PT to the rounding circuit 6 through a bus 14. These operations are performed according to a control signal C3 sent from the controller 15.

The assumed point register 7 may be simply formed by a latch circuit.

The ALU 2 is capable of arithmetic and logic operations of integers including no binary point. The ALU 2 itself is unable to perform a floating-point arithmetic operation. The ALU 2 calculates or detects the position of the actual binary point P (i.e., the number of digits of the fraction) of the gain K applied through the bus 9 according to a control signal C4 sent from the controller 15. Thus, the ALU 2 outputs the position data PT of the actual binary point P of the gain K and the bit number data n thereof to be shifted to the bus 5 through a bus 11. The position data PT and the bit number data n thus detected are stored in the registers 1a and 1b through the bus 5, respectively.

The value of the position data PT is not always equal to that of the bit number data n.

the bidirectional shifter 3 receives the position data PT from the register 1a through the bus 9. Then, the shifter 3 outputs the position data PT to the bus 5 without shifting operation through a bus 12. These operations are performed according to a control signal C5 sent from the controller 15.

Also, the shifter 3 receives the gain K and the bit number data n from the registers 1c and 1b through the buses 9 and 10, respectively. Then, the shifter 3 shifts left the gain K by the specific bits equal to the bit number data n, outputting the coefficient k to the bus 5 through a bus 12. These operations are carried out according to the control signal C5.

Further, the shifter 3 receives the rounded product Y and the bit number data n from the registers 1e and 1b through the buses 9 and 10, respectively. Then, the shifter 3 shifts right the rounded product Y by the bits equal to the bit number data n, outputting the product y to the bus 12. These operations are carried out according to the control signal C5.

The multiplier 4 receives the coefficient k and the variable x from the registers 1c and 1d through the buses 9 and 10, respectively. The multiplier 4 multiplies the coefficient k and the variable x, outputting the product Y' (=k·x) to the rounding circuit 6 through a bus 13. These operations are carried out according to a control signal C6 sent from the controller 15.

The rounding circuit 6 receives the product Y' (=k·x) outputted from the multiplier 4 and the position data PT of the gain K outputted from the assumed point register 7. Then, the circuit 6 rounds off the product Y' so as to accord with the position data PT of the assumed point P'.

For example, the rounding operation in the rounding circuit 6 is implemented in the following way.

The value of the fraction of the product Y', which is given by the position data PT of the assumed point P' and the bit number data n, is compared with a binary number of 0.1 (i.e., $0.1_{two}$). In other words, it is judged whether the value of bit (n−1) of the product Y' is 1 or 0.

When the value of the fraction of the product Y' is equal to or greater than $0.1_{two}$ (=$0.5_{ten}$), in other words, when the value of bit (n=1) of the product Y' is $1_{two}$, an increment of a binary number 1 (i.e., $1_{two}$) is added to the value of bit (n−1) of the product Y' for the rounding purpose. This means that a number of $1_{two}$ is added to the value of bit n of the product Y'.

When the value of the fraction of the product Y' is less than $0.1_{two}$ or $0.5_{ten}$, in other words, when the value of bit (n−1) of the product Y' is $0_{two}$, no increment is added to the value of bit (n−1) of the product Y'. This means that the value of bit n of the product Y' is not changed here.

Thus, the rounding circuit 6 outputs the rounded product Y to the bus 5 through a bus 8.

The above rounding operation of the rounding circuit 6 is performed according to a control signal C7 sent from the controller 15.

It is clear that the rounding circuit 6 may be simply formed by the combination of a one-direction shifter, a comparator, and an adder.

Figure 4:
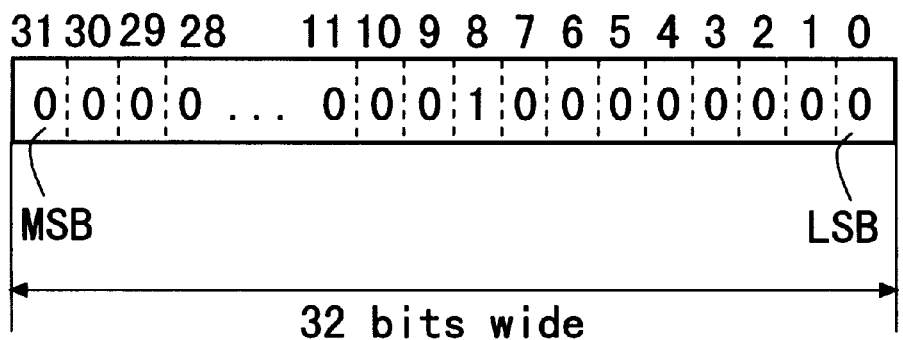
FIG. 4 is a diagram schematically showing an example of the position data value giving the position of the assumed point of the multiplication result Y' used in the system according to the first embodiment.

FIG. 4 shows an example value of the position data PT giving the position of the assumed point P' of the multiplication result Y' used in the system according to the first embodiment. In this example, the value is 32 bits wide, and the value of bit 8 only is "$1_{two}$" and the value of the remainder is all "$0_{two}$". Specifically, this binary value is expressed as

"00000000000000000000000100000000".

On the other hand, it is supposed that the 32-bit product Y' has a value of

"01101001101001011001011.11111111".

where the notation "." represents the assumed binary point P' of the product Y'. The fraction of this value is 8 bits wide.

The binary value "11111111" of the fraction of the product Y', which is located during bit 0 to bit 7, is greater than $0.1_{two}$ or $0.5_{ten}$. Therefore, the value of the position data PT of "000000000000000000000001.00000000"="$1_{two}$"

is added to the value of bit 8 of the product Y', resulting in

"01101100110010110010111.11111111".

Also, it is supposed that the 32-bit product Y' has a value of

"01101001101001011001010.00000001".

The binary value "00000001" of the fraction of the product Y', which is located during bit 0 to bit 7, is less than $0.1_{two}$ or $0.5_{ten}$. Therefore, the value of the position data PT of "000000000000000000000001.00000000"="$1_{two}$"

is not added to the value of bit 8 of the product Y', resulting in the same value of

"01101001101001011001010.00000001".

as that prior to the rounding action.

Next, the process sequence of the arithmetic operation system according to the first embodiment is explained below with reference to FIG. 5.

In the step S1, the gain K and the variable x, which are inputted into this system through the input terminal 16 of the common bus 5, are stored in the registers 1c and 1d through the common bus 5 due to the action of the input selector 1f, respectively.

In the step S2, the gain K stored in the register 1c is read out to the bus 9 due to the action of the output selector 1g. The content of the register 1c is kept unchanged during this step. The ALU 2 receives the gain K thus read out and calculates or detects the position of its actual binary point P and the bit number to be shifted in the shifter 3, outputting the position data PT of the actual binary point P of the gain K and the bit number data n thereof to the bus 11.

In the step S3, the calculated or detected position data PT and the bit number data n by the ALU 2 are stored in the registers 1a and 1b through the common bus 5, respectively.

In the step S4, the position data PT stored in the register 1a is read out to be inputted into the shifter 3. The shifter 3 outputs the position data PT thus inputted to the bus 12 without shifting.

In the step S5, the position data PT, which is outputted to the bus 12 by the shifter 3, is stored in the assumed point register 7 through the common bus 5. The stored position data PT may be read out by the rounding circuit 6 as necessary.

In the step S6, the gain K and the bit number data n stored in the registers 1c and 1b are read out to the shifter 3. Then, the shifter 3 shifts left the gain K by specific bits equal to the bit number data n, outputting the coefficient k having an integer value to the bus 12.

In the step S7, the coefficient k is stored in the register 1c through the bus 5. Thus, the content of the register 1c is changed from the gain K to the coefficient k.

In the step S8, the coefficient k stored in the register 1c and the variable x stored in the register 1d are read out to be applied to the multiplier 4. Then, the multiplier 4 multiplies the coefficient k and the variable x, resulting in the product Y' (=k·x). The product Y' is outputted to the bus 13.

In the step S9, the rounding circuit 6 receives through the bus 13 the product Y' outputted from the multiplier 4. On the other hand, the rounding circuit 6 receives the position data PT stored in the assumed point register 7. Then, the rounding circuit 6 rounds off the product Y' according to the position data PT, outputting the rounded product Y to the bus 8.

In the step S10, the rounded product Y outputted from the rounding circuit 6 is stored in the register 1e through the common bus 5.

In the step S11, the rounded product Y stored in the register 1e and the bit number data n stored in the register 1b are read out to be inputted into the shifter 3. The shifter 3 shifts right the rounded product Y by the bits equal to the bit number data n, outputting the product y to the bus 12.

In the step S12, the product y thus outputted from the shifter 3 is outputted through the output terminal 17 and stored in the register 1e through the bus 5.

The contents of the registers 1a, 1b, 1c, 1d, and is of the register file 1 and the assumed point register 7 in the steps S1 to S12 are shown in TABLE 1.

TABLE 1

| | Register Contents | | | | | |
|---|---|---|---|---|---|---|
| | 1a | 1b | 1c | 1d | 1e | 7 |
| Step 1 | — | — | K | X | — | — |
| Step 2 | — | — | K | X | — | — |

TABLE 1-continued

| | Register Contents | | | | | |
|---|---|---|---|---|---|---|
| | 1a | 1b | 1c | 1d | 1e | 7 |
| Step 3 | PT | n | K | X | — | — |
| Step 4 | PT | n | K | X | — | — |
| Step 5 | PT | n | K | X | — | PT |
| Step 6 | PT | n | k | x | — | PT |
| Step 7 | PT | n | k | x | — | PT |
| Step 8 | PT | n | k | x | — | PT |
| Step 9 | PT | n | k | x | — | PT |
| Step 10 | PT | n | k | x | Y | PT |
| Step 11 | PT | n | k | x | Y | PT |
| Step 12 | PT | n | k | x | y | PT |

Figure 5:
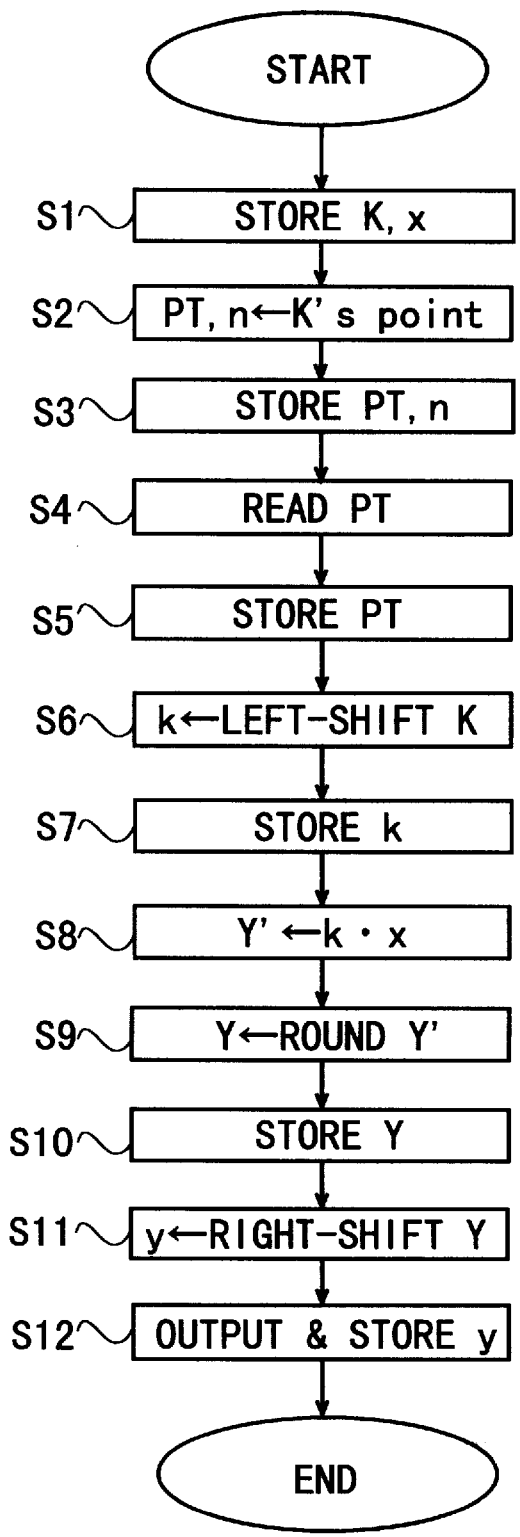
FIG. 5 is a flow chart showing the step sequence of the floating-point arithmetic operation of the system according to the first embodiment.

With the arithmetic operation system according to the first embodiment in FIGS. 3 and 5, the position of the actual point P of the gain K is detected by the ALU serving as an actual point detector, resulting in the position data PT and the bit number data n. The coefficient k having no actual point is generated by shifting left the gain K having the actual point P by the bidirectional shifter 3 according to the bit number data n. The coefficient k and the variable x, both of which have no actual point, are multiplied by the multiplier 4, thereby outputting the product Y' serving as a first multiplication result.

The product Y' serving as the first multiplication result thus outputted is then rounded off by the rounding circuit 6 according to the designated assumed point P' of the product Y', thereby outputting the rounded product Y serving as a second multiplication result.

Further, the product y serving as a third multiplication result, which has no actual point, is generated by shifting right the rounded product Y serving as the second multiplication result thus rounded by the shifter 3 according to the bit number data n.

Accordingly, a floating-point arithmetic operation for the gain K and the variable x is able to be performed without any dedicated floating-point arithmetic operating DSP nor dedicated floating-point arithmetic operation unit. This leads to decrease in fabrication cost of this system.

Also, the above arithmetic operation is performed by using the ALU 2 serving as an actual point detector, the registers 1a and 1b, the bidirectional shifter 3, the multiplier 4 serving as an integer arithmetic operator, the ALU 2 and the assumed point register 7 serving as an assumed point designator, and the rounding circuit 6. In other words, this operation is performed without the use of any dedicated software for floating-point arithmetic operation, with the use of hardware devices.

As a result, this arithmetic operation is able to be performed at high speed using minimal hardware devices while minimizing the instruction processing steps of a CPU.

There is an additional advantage that no competition between the rounding process of the multiplication result Y' by the rounding circuit 6 and the reading process of the register file 1 will occur.

SECOND EMBODIMENT

Figure 6:
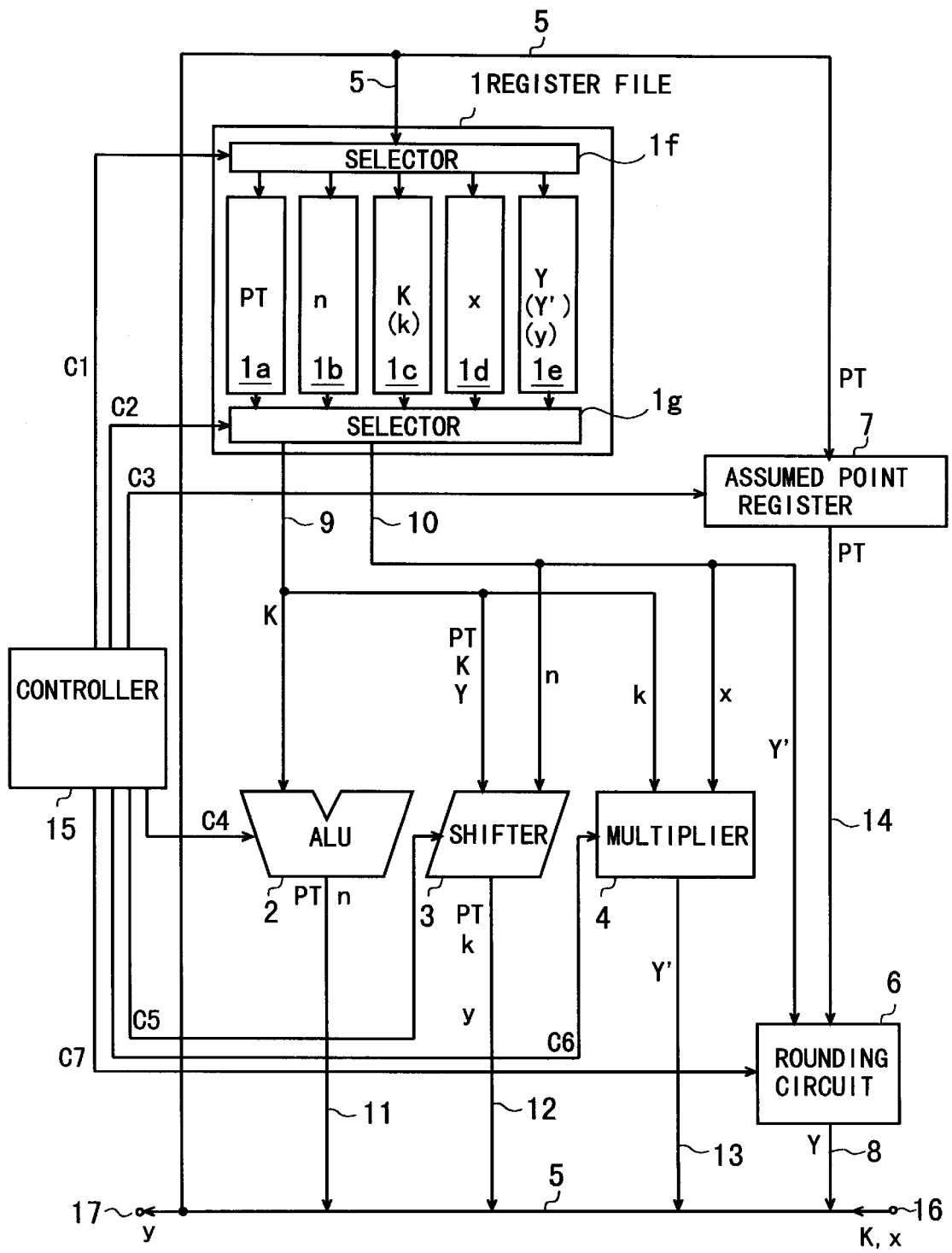
FIG. 6 is a block diagram showing the configuration of an arithmetic operation system according to a second embodiment of the present invention.

An arithmetic operation system according to a second embodiment of the present invention is shown in FIG. 6. This system has substantially the same configuration as that of the first embodiment in FIG. 3 except that (i) the bus 13 of the multiplier 4 is not connected to the rounding circuit 6 but connected to the common bus 5 and that (ii) the bus 10 of the register file 1 is connected to not only the shifter 3 and the multiplier 4 but also to the rounding circuit 6.

Therefore, the description relating to the same configuration is omitted here by attaching the same reference numerals or characters to the same or corresponding elements in FIG. 6 for the sake of simplification of description.

Next, the process sequence of the arithmetic operation system according to the second embodiment is explained below with reference to FIG. 7.

In the step S1, the gain K and the variable x, which are inputted into this system through the input terminal 16 of the common bus 5, are stored in the registers 1c and 1d through the common bus 5 due to the action of the input selector 1f, respectively.

In the step S2, the gain K stored in the register 1c is read out to the bus 9 due to the action of the output selector 1g. The content of the register 1c is kept unchanged during this step. The ALU 2 receives the gain K thus read out and calculates or detects the position of its actual binary point P and the bit number to be shifted in the shifter 3, outputting the position data PT of the actual binary point P of the gain K and the bit number data n thereof to the bus 11.

In the step S3, the calculated or detected position data PT and the bit number data n by the ALU 2 are stored in the registers 1a and 1b through the common bus 5, respectively.

In the step S4, the position data PT stored in the register 1a is read out to be inputted into the shifter 3. The shifter 3 outputs the position data PT thus inputted to the bus 12 without shifting.

In the step S5, the position data PT, which is outputted to the bus 12 by the shifter 3, is stored in the assumed point register 7 through the common bus 5. The stored position data PT may be read out by the rounding circuit 6 as necessary.

In the step S6, the gain K and the bit number data n stored in the registers 1c and 1b are read out to the shifter 3. Then, the shifter 3 shifts left the gain K by specific bits equal to the bit number data n, outputting the coefficient k having an integer value to the bus 12.

In the step S7, the coefficient k is stored in the register 1c through the bus 5. Thus, the content of the register 1c is changed from the gain K to the coefficient k.

In the step S8, the coefficient k stored in the register 1c and the variable x stored in the register 1d are read out to be applied to the multiplier 4. Then, the multiplier 4 multiplies the coefficient k and the variable x, resulting in the product Y'(=k·x). The product Y' is outputted to the bus 13.

The above steps S1 to S8 are the same as those in the first embodiment.

In the step S9, the product Y' outputted from the multiplier 4 is stored in the register 1e through the buses 13 and 5.

In the step S10, the product Y' stored in the register 1e is read out to be applied to the rounding circuit 6. On the other hand, the position data PT stored in the assumed point register 7 is read out to be applied to the rounding circuit 6. Then, the rounding circuit 6 rounds off the product Y' according to the position data PT, outputting the rounded product Y to the bus 8.

In the step S11, the rounded product Y outputted from the rounding circuit 6 is stored in the register 1e through the bus 8 and the common bus 5.

In the step S12, the rounded product Y stored in the register 1e and the bit number data n stored in the register 1b are read out to be inputted into the shifter 3. The shifter 3 shifts right the rounded product Y by the bits equal to the bit number data n, outputting the product y to the shifter 3 is outputted through the output terminal 17 and stored in the register 1e through the bus 5.

The contents of the registers 1a, 1b, 1c, 1d, and 1e of the register file 1 and the assumed point register 7 in the steps S1 to S12 are shown in TABLE 2.

TABLE 2

|  | \multicolumn{6}{c}{Register Contents} | | | | | |
| --- | --- | --- | --- | --- | --- | --- |
|  | 1a | 1b | 1c | 1d | 1e | 7 |
| Step 1 | — | — | K | x | — | — |
| Step 2 | — | — | K | x | — | — |
| Step 3 | PT | n | K | x | — | — |
| Step 4 | PT | n | K | x | — | — |
| Step 5 | PT | n | K | x | — | PT |
| Step 6 | PT | n | K | x | — | PT |
| Step 7 | PT | n | k | x | — | PT |
| Step 8 | PT | n | k | x | — | PT |
| Step 9 | PT | n | k | x | Y' | PT |
| Step 10 | PT | n | k | x | Y' | PT |
| Step 11 | PT | n | k | x | Y | PT |
| Step 12 | PT | n | k | x | Y | PT |
| Step 13 | PT | n | k | x | y | PT |

Figure 7:
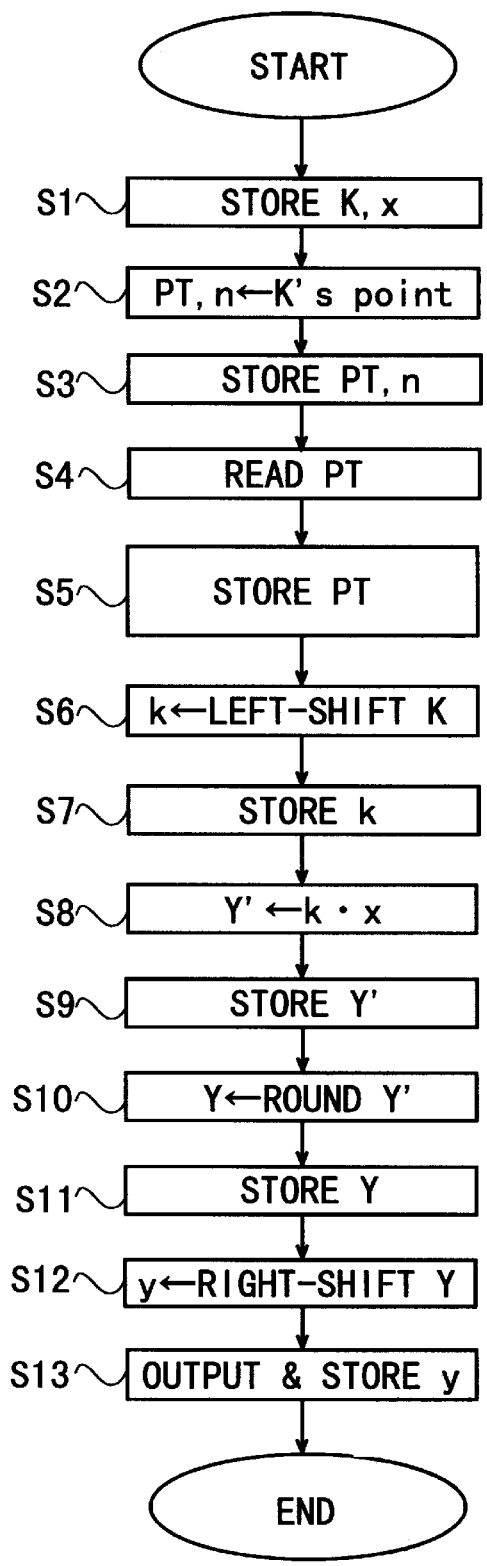
FIG. 7 is a flow chart showing the step sequence of the floating-point arithmetic operation of the system according to the second embodiment.

The arithmetic operation system according to the second embodiment in FIG. 6 and 7 has the same advantages as those in the first embodiment, because this system has substantially the step configuration as that of the first embodiment.

There is an additional advantage that various arithmetic operations may be performed by necessary by using the multiplication result Y' stored in the register 1e.

THIRD EMBODIMENT

An arithmetic operation system according to the second embodiment in FIG. 6 and 7 has the same advantages as those in the first embodiment, because this system has substantially the same configuration as that of the first embodiment.

There is an additional advantage that various arithmetic operations may be performed as necessary by using the multiplication result Y' stored in the register 1e.

THIRD EMBODIMENT

Figure 8:
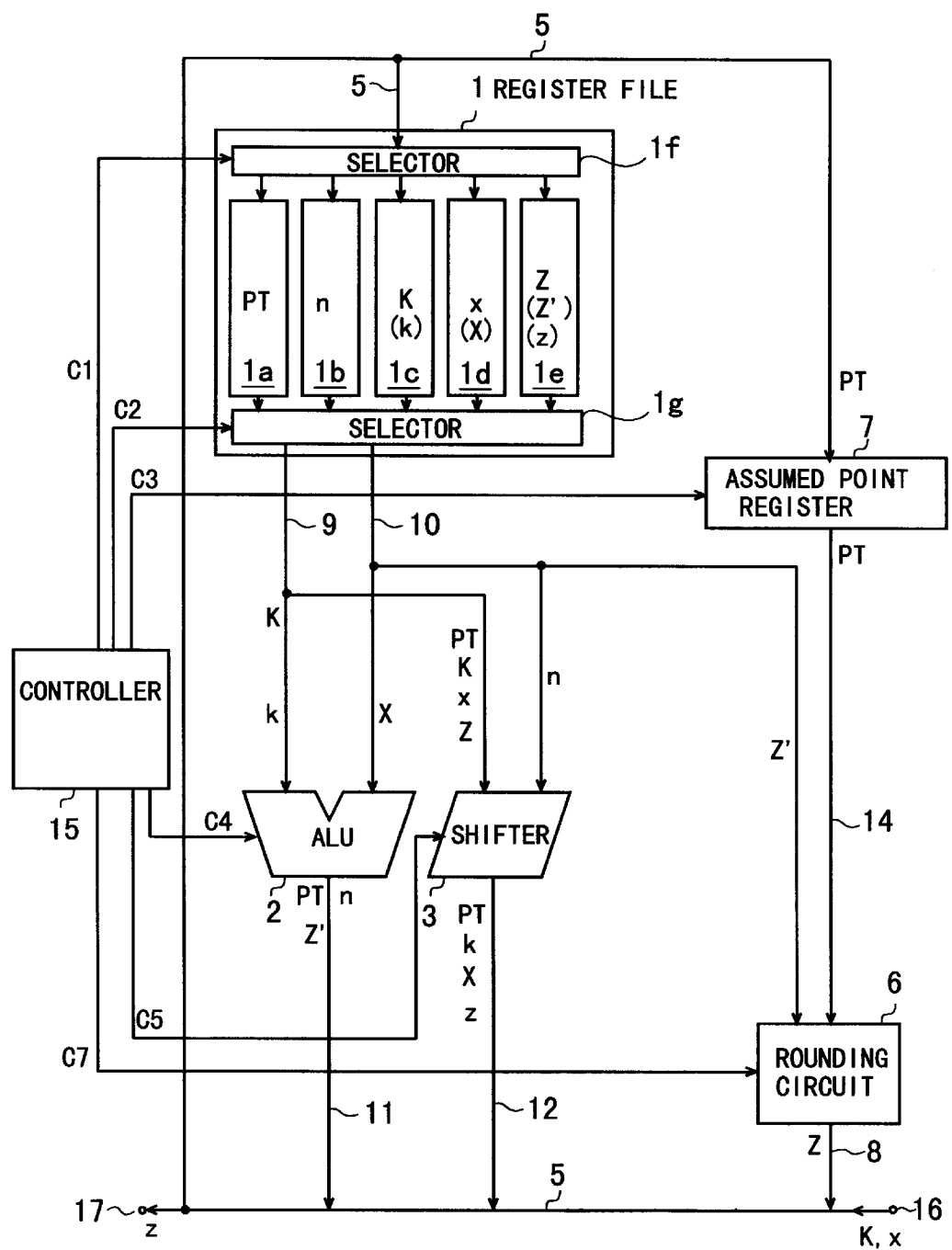
FIG. 8 is a block diagram showing the configuration of an arithmetic operation system according to a third embodiment of the present invention.

An arithmetic operation system according to a third embodiment of the present invention is shown in FIG. 8. This system has substantially the same configuration as that of the first embodiment in FIG. 3 except that (i) the multiplier 4 and its corresponding bus 13 are canceled and that (ii) the bus 10 of the register file 1 is connected to not only the shifter 3 but also to the ALU 2 and the rounding circuit 6.

Therefore, the description relating to the same configuration is omitted here by attaching the same reference numerals or characters to the same or corresponding elements in FIG. 8 for the sake of simplification of description.

Next, the process sequence of the arithmetic operation system according to the third embodiment is explained below with reference to FIG. 9.

In the step S1, the gain K and the variable x, which are inputted into this system through the input terminal 16 of the common bus 5, are stored in the registers 1c and 1d through the common bus 5 due to the action of the input selector 1f, respectively.

In the step S2, the gain K stored in the register 1c is read out to the bus 9 due to the action of the output selector 1g. The content of the register 1c is kept unchanged during this step. The ALU 2 receives the gain K thus read out and calculates or detects the position of its actual binary point P and the bit number to be shifted in the shifter 3, outputting the position data PT of the actual binary point P of the gain K and the bit number data n thereof to the bus 11.

In the step S3, the calculated or detected position data PT and the bit number data n by the ALU 2 are stored in the registers 1a and 1b through the common bus 5, respectively.

In the step S4, the position data PT stored in the register 1a is read out to be inputted into the shifter 3. The shifter 3 outputs the position data PT thus inputted to the bus 12 without shifting.

In the step S5, the position data PT, which is outputted to the bus 12 by the shifter 3, is stored in the assumed point register 7 through the common bus 5. The stored position data PT may be read out by the rounding circuit 6 as necessary.

In the step S6, the gain K and the bit number data n stored in the registers 1c and 1b are read out to be applied to the shifter 3 through the buses 9 and 10. Then, the shifter 3 shifts left the gain K by specific bits equal to the bit number data n, outputting the coefficient k having an integer value to the bus 12.

In the step S7, the coefficient k is stored in the register 1c through the bus 5. Thus, the content of the register 1c is changed from the gain K to the coefficient k.

The above steps S1 to S7 are the same as those in the first embodiment.

In the step S8, the bit number data n stored in the register 1b and the variable x stored in the register 1d are read out to be applied to the shifter 3 through the buses 9 and 10. Then, to align the actual points of the variable x and the coefficient k with each other, the shifter 3 shifts left the variable x by specific bits equal to the bit number data n, resulting in a variable X having no actual point. The variable X is outputted to the bus 12.

In the step S9, the variable X outputted from the shifter 3 is stored in the register 1d through the buses 12 and 5. The content of the register 1d is changed from x to X.

In the step S10, the coefficient k and the variable X stored in the registers 1c and 1d are read out to be applied to the ALU 2 through the buses 9 and 10. Then, the ALU 2 adds the coefficient k and the variable x, outputting a sum Z' to the bus 11.

In the step S11, the sum Z' outputted from the ALU 2 is stored in the register 1e through the bus 11 and the common bus 5.

In the step S12, the sum Z' stored in the register 1e is read out to be inputted into the rounding circuit 6 through the bus 10. On the other hand, the position data PT stored in the assumed point register 7 is read out to be inputted into the rounding circuit 6 through the bus 14. The rounding circuit 6 rounds off the sum Z' according to the position data PT, outputting a rounded sum Z to the bus 8.

In the step S13, the rounded sum Z is stored in the register 1e through the buses 8 and 5.

In the step S14, the rounded sum Z stored in the register 1e and the bit number data n stored in the register 1b are read out to be inputted into the shifter 3 through the buses 9 and 10. The shifter 3 shifts right the rounded sum Z by the bits equal to the bit number data n, outputting the sum z to the bus 12.

In the step S15, the sum z thus outputted from the shifter 3 is outputted through the output terminal 17 and stored in the register 1e through the bus 5.

The contents of the registers 1a, 1b, 1c, 1d, and 1e of the register file 1 and the assumed point register 7 in the steps S1 to S12 are shown in TABLE 3.

TABLE 3

| | \tRegister Contents | | | | | |
|---|---|---|---|---|---|---|
| | 1a | 1b | 1c | 1d | 1e | 7 |
| Step 1 | — | — | K | x | — | — |
| Step 2 | — | — | K | x | — | — |
| Step 3 | PT | n | K | x | — | — |
| Step 4 | PT | n | K | x | — | — |
| Step 5 | PT | n | K | x | — | PT |
| Step 6 | PT | n | K | x | — | PT |
| Step 7 | PT | n | k | x | — | PT |
| Step 8 | PT | n | k | x | — | PT |
| Step 9 | PT | n | k | X | — | PT |
| Step 10 | PT | n | k | X | — | PT |
| Step 11 | PT | n | k | X | Z' | PT |
| Step 12 | PT | n | k | X | Z' | PT |
| Step 13 | PT | n | k | X | Z | PT |
| Step 14 | PT | n | k | X | Z | PT |
| Step 15 | PT | n | k | X | z | PT |

Figure 9:
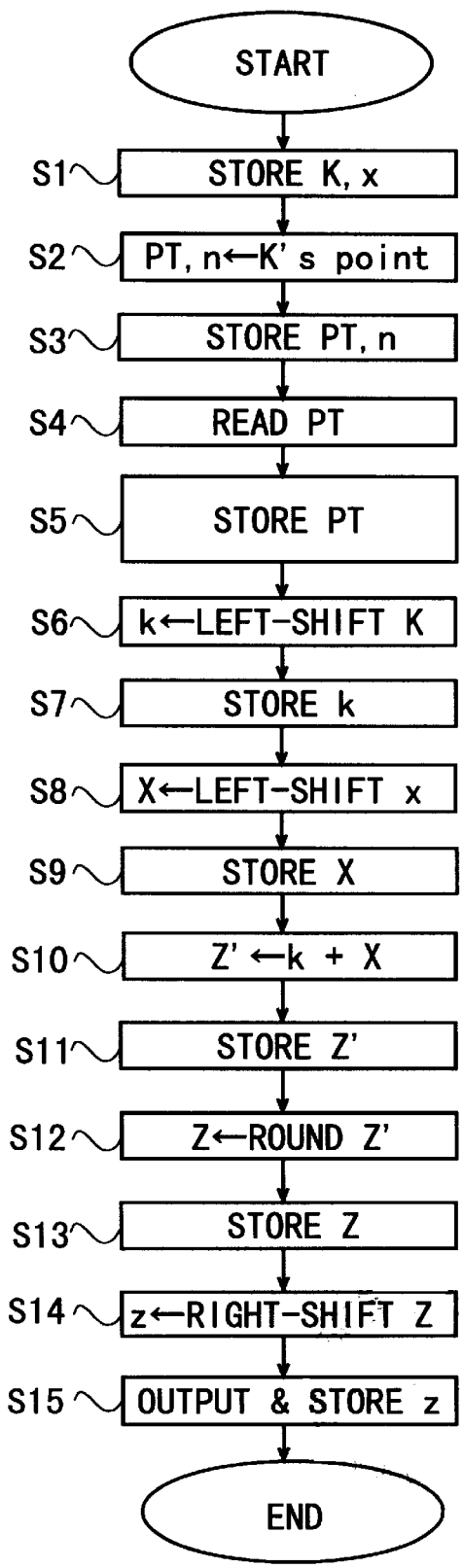
FIG. 9 is a flow chart showing the step sequence of the floating-point arithmetic operation of a floating-point arithmetic operation system according to the third embodiment.

The arithmetic operation system according to the third embodiment in FIG. 8 and 9 has the same advantages as those in the first embodiment, because this system has substantially the same configuration as that of the first embodiment.

Unlike the first and second embodiments, the addition is performed in the system according to the third embodiment.

While the preferred forms of the present invention has been described, it is to be understood that modifications will be apparent to those skilled in the art without departing from the spirit of the invention. The scope of the invention, therefore, is to be determined solely by the following claims.

What is claimed is:

1. An arithmetic operation system for arithmetically operating a first operand having an actual point and a second operand having no actual point;

said system comprising:
(a) an actual point detector for detecting a position of said actual point of said first operand to output a first position data and a bit number data;
(b) a first register for storing said first position data;
(c) a second register for storing said bit number data;
(d) a shifter for shifting left said first operand by specific bits according to said bit number data stored in said second register to output a third operand having no actual point;
(e) an integer arithmetic operator for arithmetically operating said second and third operands to output a first operation result;
(f) an assumed point designator for designating a position of an assumed point of said first operation result according to said first position data; and
(g) a rounder for rounding said first operation result according to said designated assumed point of said first operation result by said assumed point designator to output a second operation result;

wherein said shifter is also for shifting right said second operation result by said specific bits according to said bit number data to output a third operation result having no actual point, and wherein said third operation result represents a rounded operation result of said first and second operands.

2. The system as claimed in claim 1, wherein said output of said integer arithmetic operator is connected to an input of said rounder, so that said first operation result outputted from said integer arithmetic operator is directly inputted into said rounder.

3. The system as claimed in claim 1, further comprising a third register for storing said second operation result outputted from said integer arithmetic operator;

wherein said second operation result stored in said third register is applied to said rounder.

4. The system as claimed in claim 1, wherein said assumed point designator outputs a second position data giving said position of said assumed point of said first operation result;

and wherein said second position data is stored in a fourth register.

5. The system as claimed in claim 1, wherein said actual point detector is formed by an ALU.

6. The system as claimed in claim 1, wherein said shifter is a single bidirectional shifter.

7. An arithmetic operation system for arithmetically operating a first operand having an actual pint and a second operand having no actual point;

(a) an ALU for detecting a position of said actual point of said first operand to output a position data and a bit number data;
(b) a first register for storing said first position data;
(c) a second register for storing said bit number data;
(d) a bidirectional shifter for shifting left said first operand by specific bits according to said bit number data stored in said second register to output a third operand having no actual point;
(e) a multiplier for multiplying said second and third operands to output a first multiplication result;
(f) a third register for storing a second position data of an assumed point of said first operation result; and
(g) a rounding circuit for rounding said first multiplication result according to said second position data stored in said third register to output a second multiplication result;

wherein said bidirectional shifter shifts right said second multiplication result by specific bits according to said second position data of said assumed point of said first multiplication result to output a third multiplication result having no actual point;

and wherein said third operation result represents a rounded multiplication result of said first and second operands.

8. The system as claimed in claim 7, wherein said output of said multiplier is connected to an input of said rounding circuit, so that said second multiplication result outputted from said multiplier is directly applied to said rounding circuit.

9. The system as claimed in claim 7, further comprising a fourth register for storing said second multiplication result:

wherein said second multiplication result outputted from said multiplier is applied to said rounding circuit through said fourth register.

10. The system as claimed in claim 7, wherein said first and second registers are provided in a first hardware device, and said third register is formed by a second hardware device which is controlled independent of said first hardware device.

11. An arithmetic operation system for arithmetically operating a first operand having an actual point and a second operand having no actual point;

said system comprising:
(a) an ALU for detecting a position of said actual point of said first operand to output a position data and a bit number data;
(b) a first register for storing said first position data;

(c) a second register for storing said bit number data;
(d) a bidirectional shifter for shifting left said first operand by specific bits according to said bit number data stored in said second register to output a third operand having no actual point;
(e) a multiplier for multiplying said second and third operands to output a first multiplication result;
(f) a third register for storing a second position data of an assumed point of said first operation result; and
(g) a rounding circuit for rounding said first operation result according to said second position data stored in said third register to output a second operation result;

wherein said bidirectional shifter shifts right said second operation result by specific bits according to said second position data of said assumed point of said first operation result to output a third operation result having no actual point;

and wherein said third operation result represents a rounded multiplication result of said first and second operands.

12. The system as claimed in claim 11, further comprising a fourth register for storing said second operation result:

wherein said second operation result outputted from said ALU is applied to said rounding circuit through said fourth register.

13. The system as claimed in claim 11, wherein said first and second registers are provided in a first hardware device, and said third register is formed by a second hardware device which is controlled independent of said first hardware device.

14. An arithmetic operation system for arithmetically operating a first operand having an actual point and a second operand having no actual point;

wherein a position of said actual point of said first operand is detected by an actual point detector to output a first position data and a bit number data, said position data and said bit number data being stored in first and second registers, respectively;

and wherein said first operand is shifted to left by specific bits according to said bit number data stored in said second register to output a third operand having no actual point;

and wherein said second and third operands are subjected to an integer arithmetic operation performed by an integer arithmetic operator to output a first operation result;

and wherein said first operation result is rounded according to said position data stored in said first register to output a second operation result;

and wherein said second operation result is shifted to right by said specific bits according to said bit number data stored in said second register to output a third operation result having an actual point;

and wherein said third operation result represents a final operation result of said first and second operands;

characterizing in that
said first operand is shifted to left by a first shifter and said second operation result is shifted to right by a second shifter; and that
said first operation result is rounded by a rounder.

15. The system as claimed in claim 1, wherein said shifter further comprises:
a first shifter for said shifting left of said first operand; and
a second shifter for said shifting right of said second operation result.

* * * * *